Patented July 29, 1952

2,605,292

UNITED STATES PATENT OFFICE 2,605,292

PREPARATION OF BUTYLENE GLYCOL ETHERS

Gershon J. Shugar, Jersey City, and Walter D. Paist, Orange, N. J., assignors to Celanese Corporation of America, a corporation of Delaware No Drawing. Application May 9, 1947, Serial No. 747,126

1 Claim. (Cl. 260—615)

This invention relates to the production of ethers of 1,4-butanediol by a novel process which comprises reacting tetramethylene oxide with an alcohol or other organic compound containing a free ether-forming hydroxy group.

An object of this invention is to provide an improved process for the production of the mono- and di-ethers of 1,4-butanediol.

Another object of this invention is the preparation of mono- and di-ethers of 1,4-butanediol by reacting tetramethylene oxide with an organic compound containing a free ether-forming hydroxy group, whereby the cyclic tetramethylene oxide ring is split open and the desired ethers are formed.

Other objects of this invention will appear from the following detailed description.

We have found that mono- and di-ethers of 1,4-butanediol may be obtained by catalytically reacting tetramethylene oxide with an organic compound containing a free ether-forming hydroxy group at an elevated temperature of at least 250° C. under super-atmospheric pressure. The combined effect of high temperature and pressure results in a splitting of the cyclic tetramethylene oxide ring with the formation of the mono- and di-ethers of 1,4-butanediol, the particular ether obtained depending upon the hydroxy compound reacted therewith.

Thus, aliphatic alcohols of any desired chain length may be reacted with tetramethylene oxide in accordance with our novel process to yield the corresponding mono- and di-ethers of 1,4-butanediol. Thus, we may react tetramethylene oxide with methyl alcohol, ethyl alcohol, propyl alcohol, butyl alcohol, octyl alcohol, decyl alcohol, lauryl alcohol or stearyl alcohol, for example, and may thus obtain 1,4-butanediol monomethyl ether, 1,4-butanediol dimethyl ether, as well as 1,4-butanediol monoethyl ether, 1,4-butanediol diethyl ether, 1,4- butanediol monopropyl ether, 1,4-butanediol dipropyl ether, 1,4-butanediol monobutyl ether, 1,4-butanediol dibutyl ether, 1,4-butanediol monooctyl ether, 1,4-butanediol dioctyl ether, 1,4-butanediol monodecyl ether, 1,4-butanediol didecyl ether, 1,4-butanediol monolauryl ether, 1,4-butanediol dilauryl ether, 1,4-butanediol monostearyl ether, as well as 1,4-butanediol distearyl ether. Organic hydroxy compounds such as benzyl alcohol, cyclohexanol, etc. may also be employed to form the corresponding mono- and di-ethers of 1,4-butanediol.

Polyhydroxy aliphatic alcohols such as ethylene glycol, glycerol, propanediol, diethylene glycol, and the like may also be reacted with tetramethylene oxide in accordance with our novel process to form the corresponding mono- and di-ethers of said polyhydroxy compounds.

In effecting the desired condensation reaction whereby said mono- and di-ethers are formed, we preferably effect the reaction in an autoclave under pressure employing a temperature of at least 250° C., say about 260° C. for about 8 to 14 hours. A super-atmospheric pressure is developed into the autoclave during the reaction. This pressure together with any added external pressure, which may also be applied, may be up to about 2000 pounds per square inch, or more.

As examples of catalysts which may be employed in effecting said ring-opening and condensation reaction, there may be mentioned anhydrous zinc chloride, aluminum chloride, ferric chloride, and bismuth chloride, for example.

At the completion of reaction the mixture obtained may be fractionally distilled at atmospheric pressure or at subatmospheric pressure to separate the mono-ethers which have formed from the di-ethers and from any unreacted tetramethylene oxide and hydroxy compound.

In order further to illustrate our invention, but without being limited thereto, the following examples are given:

Example I

A mixture of 490 parts by weight of ethanol, 720 parts by weight of tetramethylene oxide and 25 parts by weight of freshly fused zinc chloride are placed in an autoclave, the latter is sealed and then heated to a temperature of 260° C. for about 14 hours. At the completion of this reaction the autoclave is cooled, and the reaction mixture obtained is removed. On fractionating the product, a fraction boiling from 160 to 162° C. and another fraction boiling at from 181 to 183° C. are separated. The former comprises 1,4-butanediol diethyl ether while the latter consists of 1,4-butanediol monoethyl ether. The 1,4-butanediol monoethyl ether is a solvent for coumaronindene resin and cellulose nitrate, when small amounts of alcohol are added, and is also miscible with castor oil, ethanol, ethyl ether, etc.

Example II

A mixture of 740 parts by weight of butanol, 800 parts by weight of tetramethylene oxide and 20 parts by weight of freshly fused zinc chloride are entered into an autoclave in the manner described above and, after being sealed, the autoclave is heated to a temperature of 260° C. for about 14 hours. The autoclave is cooled, vented while warm and the reaction product is fractionally distilled. A fraction boiling within the range of 185 to 255° C. is separated therefrom. On further fractionation and separation the original fraction yields both 1,4-butanediol monobutyl ether boiling at 203 to 205° C. and 1,4-butanediol dibutyl ether boiling at from about 233 to 235° C. The 1,4-butanediol monobutyl ether has a refractive index at 24° C. of 1.4280 and a density at 24° C. of 0.881. The 1,4-butanediol monobutyl ether is a solvent for polyvinyl chloride.

It is to be understood that the foregoing detailed description is given merely by way of illustration and that many variations may be made therein without departing from the spirit of our invention.

Having described our invention, what we desire to secure by Letters Patent is:

Process for the production of butyl ethers of 1,4-butanediol, which comprises catalytically reacting tetramethylene oxide with butyl alcohol at a temperature of about 260° C. and under super-atmospheric pressure employing freshly fused zinc chloride as catalyst.

GERSHON J. SHUGAR.
WALTER D. PAIST.

REFERENCES CITED

The following references are of record in the file of this patent:

UNITED STATES PATENTS

| Number | Name | Date |
|---|---|---|
| 2,094,100 | Dreyfus | Sept. 28, 1937 |
| 2,226,119 | De Groote et al. | Dec. 24, 1940 |
| 2,260,753 | Marple et al. | Oct. 28, 1941 |
| 2,380,185 | Marple et al. | July 10, 1945 |
| 2,448,664 | Fife et al. | Sept. 7, 1948 |

FOREIGN PATENTS

| Number | Country | Date |
|---|---|---|
| 650,973 | France | Oct. 3, 1928 |

OTHER REFERENCES

Palomaa et al., Ber. 71B. 574-5 (1938).